Jan. 9, 1934.  C. C. SPADONE  1,942,498
MACHINE FOR MANUFACTURING HOSE
Filed Jan. 2, 1930   3 Sheets-Sheet 1
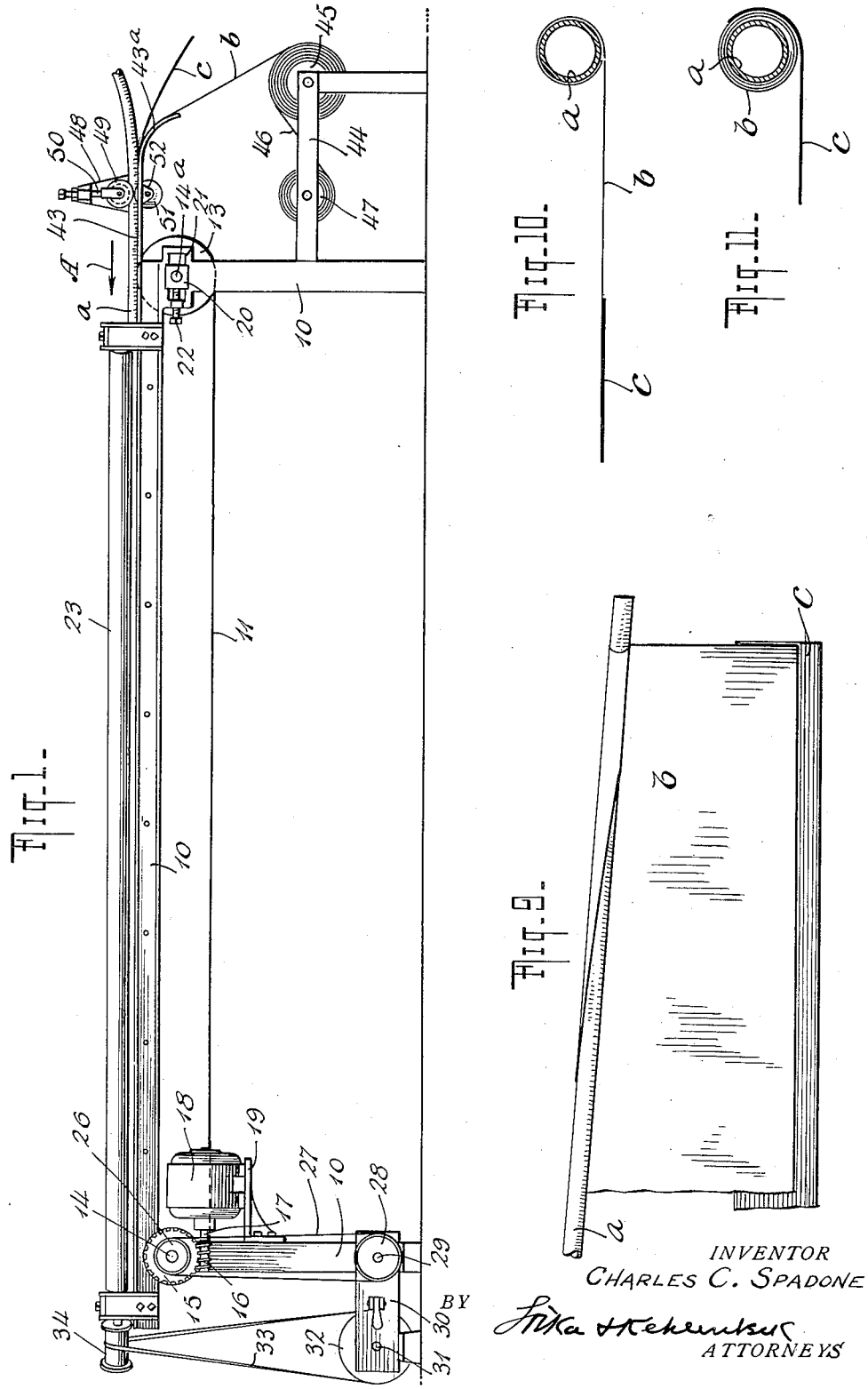
INVENTOR
CHARLES C. SPADONE
ATTORNEYS

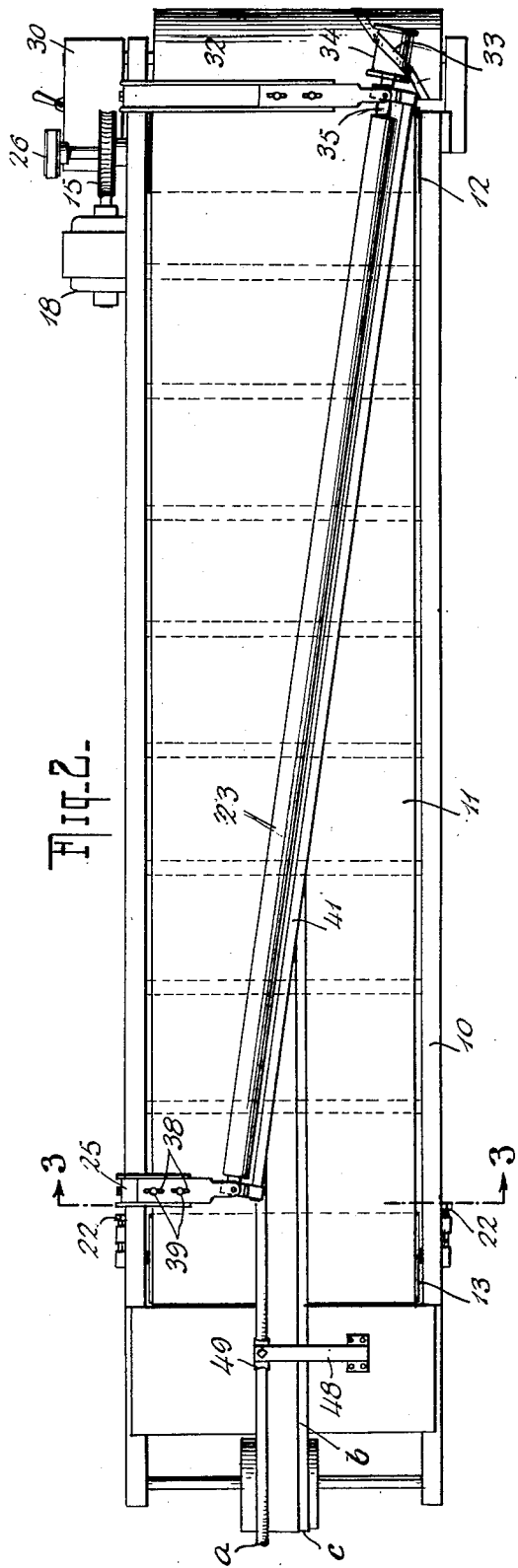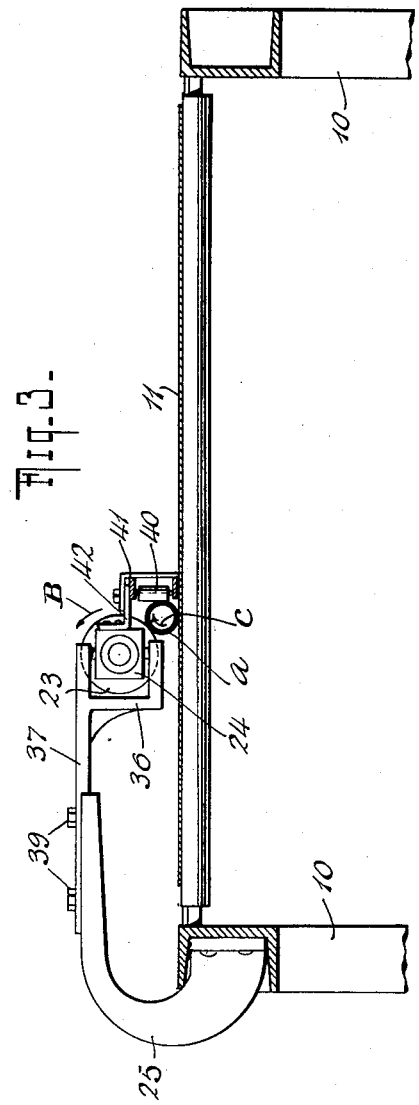

Jan. 9, 1934.     C. C. SPADONE     1,942,498
MACHINE FOR MANUFACTURING HOSE
Filed Jan. 2, 1930     3 Sheets-Sheet 3
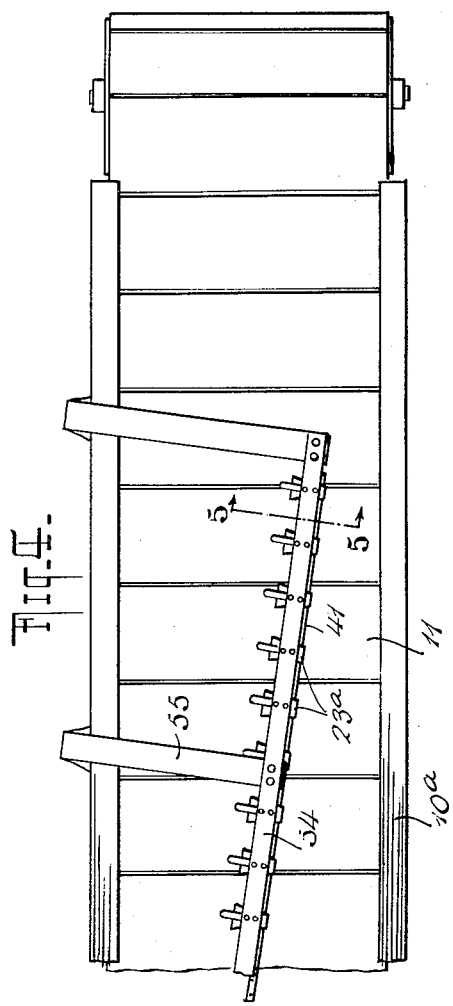
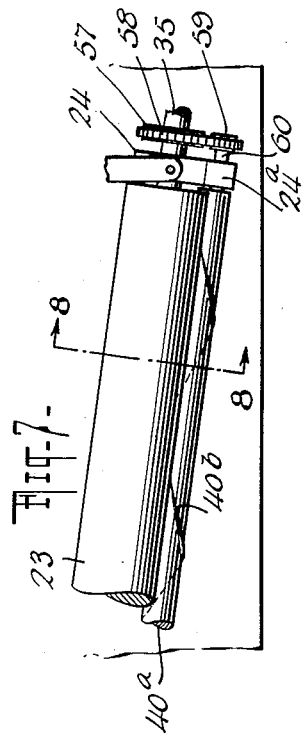
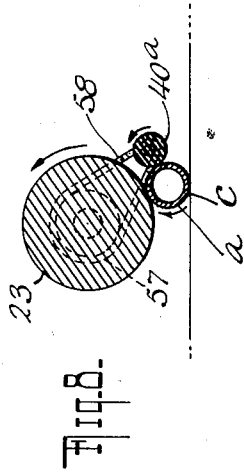
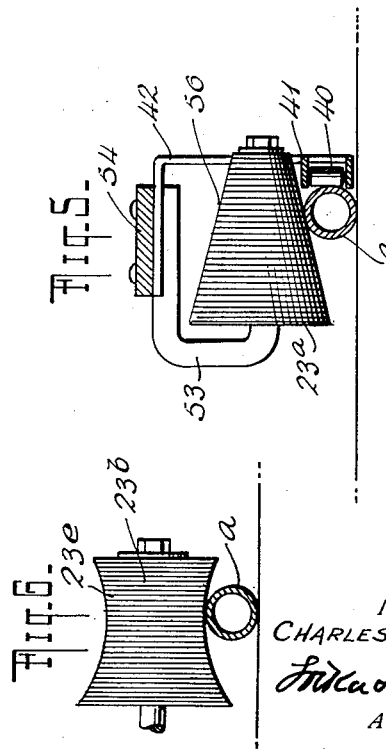
INVENTOR
CHARLES C. SPADONE
ATTORNEYS Patented Jan. 9, 1934

1,942,498

UNITED STATES PATENT OFFICE 1,942,498

MACHINE FOR MANUFACTURING HOSE

Charles C. Spadone, Rockville Center, N. Y., assignor to Spadone Machine Company, Inc., New York, N. Y., a corporation of New York Application January 2, 1930. Serial No. 418,002

18 Claims. (Cl. 154—6)

The invention relates to the manufacture of what is commonly referred to as rubber hose and more particularly to that type thereof known as wrapped fabric hose, and generally consisting of a foundation tube of rubber or other suitable material which is spirally wrapped with a covering consisting, for instance, of one or more layers of impregnated fabric enclosed in an outer cover of rubber or the like.

The object of the invention is to provide a machine of extreme simplicity in construction and operation whereby hose of the indicated class may be produced in unlimited lengths and of uniform quality in minimum periods of time and without the necessity for any particularly skilled supervision.

Other more specific objects will appear from the description hereinafter and the features of novelty will be pointed out in the claims.

In the accompanying drawings, which illustrate examples of the invention without defining its limits, Fig. 1 is a side elevation of the novel machine; Fig. 2 is a plan view thereof; Fig. 3 is an enlarged cross-section on the line 3—3 of Fig. 2; Fig. 4 is a fragmentary plan view showing another form of the novel machine; Fig. 5 is an enlarged detail section on the line 5—5 of Fig. 4; Fig. 6 is a view similar to Fig. 5 showing another arrangement; Fig. 7 is a fragmentary plan view illustrating still another form of the novel machine; Fig. 8 is an enlarged cross-section thereof on the line 8—8 of Fig. 7; Fig. 9 is a plan view of a section of the hose and its wrappers or coverings; and Figs. 10 and 11 are diagrammatic cross-sectional views showing different steps in the wrapping operation.

Wrapped hose of the type which the instant machine is particularly designed to produce usually comprises a foundation tube $a$ and a covering generally consisting of a suitable fabric $b$ impregnated with rubber or a rubber composition, and an outer cover of rubber $c$. The covering is applied by being spirally wound upon the tube $a$ in such a manner that the fabric $b$ encloses the tube $a$ and the rubber cover $c$ forms an outer envelope which completely encloses said fabric $b$. To facilitate the application or wrapping of the covering to or upon the tube $a$ the latter may be inflated, in any convenient manner, to expand said tube $a$ and give it a certain amount of body; this may be accomplished for instance by first closing one end of the tube $a$, then inflating it to the desired extent, and then sealing the other end of said tube $a$ to retain the air or other inflating medium therein. The inflated tube $a$, which may be of any desired length, is then wound upon a suitable drum or otherwise handled for delivery to the machine; if the inherent characteristics of the tube $a$ are such as to make the aforesaid inflation thereof unnecessary, this may be dispensed with.

As shown in Figs. 1, 2 and 3, the machine comprises a suitable frame 10 on which means for longitudinally feeding the foundation tube $a$ and the unapplied covering therefor, which, in the illustrated example, consists of the fabric $b$ and outer covering of rubber $c$, is mounted. In the illustrated example this feeding means comprises an endless conveyor 11, which passes over drums 12 and 13 rotatably mounted upon said frame 10 and driven at the desired speed in any suitable manner. For instance, as shown in Figs. 1 and 2, the shaft 14 of the drum 12 may carry a worm gear 15 arranged in mesh with a worm pinion 16 connected with or directly mounted upon the driving shaft 17 of an electric motor 18; the latter, as shown in Fig. 1, may be mounted upon a bracket 19 supported upon the frame 10. Suitable provision is made for maintaining the conveyor 11 under the desired tension, for instance, by rotatably mounting the shaft 14$^a$ of the drum 13 in blocks 20 slidably mounted in slots 21 with which the frame 10 is provided, said blocks 20 being adjusted in the slots 21 and secured in adjusted positions, for instance, by means of adjusting screws 22. The frame 10 also carries applying means located in operative relation to the conveyor 11, or its equivalent, for moving the tube $a$ relatively to its feeding movement to apply the covering, as will appear more fully hereinafter. In Figs. 1, 2 and 3, the applying means consists of a continuous roller 23 located at a predetermined distance above the conveyor 11 and extending in diagonal relation thereto, as shown in Fig. 2. The roller 23 is journalled in bearing blocks 24, mounted upon brackets 25, which in turn are suitably secured upon the frame 10, for instance, as shown in Fig. 3. The roller 23 is rotated in any suitable manner, for instance, by providing the shaft 14 with a pulley 26 connected by means of a belt 27 with a pulley 28 carried by a shaft 29 rotatably mounted upon the frame 10 and operatively connected by means of conventional variable speed transmission 30 with the shaft 31 of a drum 32, carried by the housing of the transmission 30, as shown in Fig. 1; the drum 32 in turn is connected by means of a belt 33 with a pulley 34 fixed upon the trunnion 35 which extends from one end of the roller 23 through one of the bearing blocks 24. The arrangement whereby the roller 23 is driven is such that said roller 23 is rotated at a slow speed relatively to the speed of travel of the conveyor 11, suitable provision, as for instance the aforesaid variable speed gearing, being made for adjusting the operations to secure the desired results. To enable the diagonal position of the roller 23 to be adjusted with respect to the conveyor 11, the bearing blocks 24 are preferably swivelled in bearings 36 forming parts of or depending from slides 37, which are slidably mounted in the brackets 25 between flanges thereof with which said brackets in such case are provided; to provide for the slidable adjustment of the slides 37 on the brackets 25, said slides include slots 38 through which set screws 39 extend, said set screws 39 serving to secure the slides 37 and consequently the roller 23 in adjusted positions. It will be noted that the drum 32 is of sufficient length to maintain the belt connection 33 with the pulley 34 in all adjusted positions of the roller 23.

The machine being described further includes independent means whereby the tube $a$ is maintained in operative engagement with the applying means during the application of the covering to the tube. In Figs. 1, 2 and 3, this independent means comprises a plurality of rollers 40, the axes of which extend transversely to the axis of the roller 23 in vertical directions, and which are mounted at spaced intervals upon a supporting bar 41 extending lengthwise of the roller 23 in spaced parallel relation thereto and fixed in place by means of brackets 42 secured upon the bearing blocks 24, as shown in Figs. 2 and 3. As shown in Fig. 3 the arrangement is such that in the operation of the machine the tube $a$ rests upon the conveyor 11 in tangential engagement with the roller 23 and the rollers 40. In addition to the parts so far described, the machine may include a guide apron 43 projecting from one end of the frame 10 and having its end 43$^a$ curved downwardly toward an auxiliary frame 44 on which a supply of the fabric $b$ in the form of a roll 45 is rotatably mounted. Because of the gummy or tacky nature of said fabric $b$, a cloth cover 46 is rolled up therewith so that said cover 46 is located between the convolutions of the impregnated fabric $b$ to prevent the same from sticking together; as the fabric $b$ is delivered to the machine in the manner to be more fully described hereinafter, the cloth cover 46 is wound upon a roll 47, journalled upon the auxiliary frame 44 and suitably driven to secure the intended result. At a suitable point, the apron 43 is provided with a bracket 48 in which a grooved pressure roller 49 is mounted by means of an upright screw 50, so as to be vertically adjustable relatively to said apron; the pressure roller 49 is located above and in registry with a grooved idler roller 51, rotatably mounted in bearings 52, which depend from the apron 43 and projecting upwardly through a slot with which said apron is provided, as shown in Fig. 1.

In practice, the end of the outside rubber cover $c$ is drawn over the curved end 43$^a$ of the apron 43 and located upon the conveyor 11, after which the impregnated fabric $b$ is drawn over said apron and placed upon said cover $c$, and by pressure suitably exerted thereon is caused to adhere to said cover $c$; it will be seen by referring to Fig. 9 that the rubber cover $c$ extends beyond the one edge of the fabric $b$ to a predetermined extent. As previously stated the cloth cover 46 is wound upon the roll 47 coincidentally with the unwinding of the fabric $b$ from its roll 45. After the fabric $b$ and outer cover $c$ have been placed in position as described, the preferably inflated tube $a$, which is to be wrapped, is drawn beneath the pressure roller 49 which has previously been raised to make this easily possible; the roller 49 is then adjusted into engagement with said tube $a$ to exert a pressure thereon whereby said tube is caused to firmly adhere to the tacky impregnated fabric $b$. As the machine is now operated the conveyor 11 will be actuated to cause its upper run to travel in the direction of the arrow A in Fig. 1 whereby the tube $a$ and the unapplied covering, represented by the fabric $b$ and outer covering $c$, will be carried along and the advancing end of said tube will finally be brought into engagement with the roller 23 in approximately the position indicated in Fig. 3 of the drawings. As the operation of the machine continues, the tube $a$ will be deflected by the roller 23 or, in other words, will be moved relatively to its feeding movement; due to the fact that the roller 23 is actuated in the direction of the arrow B in Fig. 3, the tube $a$ will be rotated in the direction of the arrow C in said figure or, in other words, will be rolled upon its own axis to cause the impregnated fabric $b$ to be wound about said tube $a$. Because of the diagonal position of the roller 23 with respect to the conveyor 11 and because of the continuous advance of the tube $a$ and the covering, the fabric $b$ will be spirally wound about the advancing tube $a$, as indicated in Fig. 9; this application of the fabric $b$ will continue and finally the outer rubber cover $c$ will be carried around and spirally wound upon said fabric $b$ to form an outer covering, to completely enclose said fabric $b$, which in turn completely envelopes the tube $a$. Successive steps in the application of the covering are clearly shown in Figs. 10 and 11 of the drawings. As the completely wrapped tube $a$ passes out of the machine at the opposite end, it may be wound upon reels or otherwise disposed of for further treatment.

Because of the direction of operation of the roller 23 and the resultant rolling movement of the tube $a$ during the application of the covering, as described, the tube $a$ has a tendency to move out of operative engagement with said roller 23. This tendency is resisted by the rollers 40, which efficiently maintain said tube $a$ in operative engagement with the roller 23, without interference with the longitudinal feeding of the tube and its covering.

In the form of the machine shown in Figs. 4 and 5, the roller 23 is replaced by a series of rollers 23$^a$ journalled on supporting studs 53, which depend from a supporting rail 54 carried by brackets 55 fixed at suitable points upon the frame 10$^a$. The supporting rail 54 extends in diagonal relation to the conveyor 11 and the rollers 23$^a$ are located at spaced intervals thereon with their axes extending obliquely across the direction of travel of said conveyor 11. The rollers 23$^a$ are of approximately conical form, as shown in Fig. 5, and preferably have their surfaces roughened as indicated at 56. This form of the machine also includes independent means for maintaining the tube $a$ in operative engagement with the rollers 23$^a$; as shown in Fig. 5, this independent means may correspond to that of Figs. 1, 2 and 3, and comprise rollers 40 mounted on a support 41 carried by brackets 42 depending from the rail 54.

In this form of the machine the tube $a$ and its unapplied covering $b$—$c$, is carried by the conveyor 11 into contact with the successive rollers 23$^a$, by which it is deflected and caused to roll upon its own axis to apply the covering as hereinbefore set forth. The rollers 40, as in the first form, serve to maintain the tube $a$ in proper operative engagement with the rollers 23$^a$ during the application of the covering thereto.

In Fig. 6 I have shown a roller 23$^b$ which corresponds to the rollers 23ª of Figs. 4 and 5 but having a concave peripheral surface as indicated at 23ᶜ; the form of the roller 23ᵇ is such that, while one end thereof may be smaller than the other, the curve of the surface 23ᶜ is so arranged that the roller will flare outwardly from an intermediate point toward its opposite ends. In practice the rollers 23ᵇ may be arranged in the machine in the same way as indicated in Fig. 4 and the machine so equipped may operate in a manner similar to that set forth with respect to Figs. 4 and 5.

When the rollers 23ᵇ are used, the tube $a$ which is to be wrapped is prevented from moving out of engagement therewith by the flaring ends of said rollers 23ᵇ as is clearly apparent from Fig. 6. It will be understood that in all other respects the machine embodying said rollers 23ᵇ may be the same as previously described both in construction and operation.

In the form shown in Figs. 7 and 8, the independent means whereby the tube $a$ is maintained in operative engagement with the applying means, instead of consisting of the rollers 40, comprises a continuous rod 40ª journalled in bearings 24ª which may comprise integral extensions of the bearing blocks 24. In this form of the machine, the trunnion 35 of the roller 23 carries a sprocket wheel 57, which is connected by means of a sprocket chain 58 with a sprocket wheel 59 carried by the trunnion 60 of the rod 40ª; it will be obvious that other means may be substituted for the sprocket wheels and chain for operatively connecting the roller 23 and rod 40ª with each other. In the preferred arrangement the latter is provided with a rib 40ᵇ, which extends spirally about said rod 40ª, as shown in Fig. 7.

As the tube $a$ is rolled upon its own axis by the roller 23 to apply the covering thereto in the same way as hereinbefore set forth, the rod 40ª will be rotated in the proper direction to maintain said tube $a$ in operative engagement with the roller 23; during this rotation of the rod 40ª, the spiral rib 40ᵇ thereof will assist in the longitudinal feeding of the tube $a$, as will be apparent. The sprocket wheels 57 and 59 are so dimensioned with respect to each other that the rod 40ª will be rotated at a speed corresponding with rotative speed imparted to the tube $a$ by the roller 23.

It will be understood that the forms of the machine shown in Figs. 4, 5, 6, 7 and 8 may include all of the features illustrated in Figs. 1, 2 and 3, and operate in the same way as described with respect thereto.

If it should become necessary to do so for any reason the rollers 23 and their associated elements may project beyond the delivery end of the machine to provide clearance for the ready removal of the completely wrapped hose from said machine.

The novel machine set forth herein does away with the use of a mandrel and makes it possible to produce wrapped hose in any length desired, and at the same time positively insures the proper and most efficient application of the covering to the foundation tube, and results in a product of absolute uniformity and maximum high quality. The machine is extremely simple and reliable in operation and requires no particularly skilled supervision.

It will be obvious that the details of the machine and all its individual elements may be varied, without affecting its utility and efficiency, the essential features required being means for longitudinally feeding the foundation tube and unapplied covering, in combination with applying means for moving said foundation tube relatively to its feeding movement, or, more specifically, for rolling it about its own axis, and independent means for maintaining said foundation tube in proper operative engagement with the means for applying the wrapper.

Various changes in the specific forms shown and described may be made within the scope of the claims without departing from the spirit of the invention.

I claim:

1. In a machine for manufacturing hose, means for longitudinally feeding a foundation tube and an unapplied covering therefor, applying means for moving said tube relatively to the feeding movement to apply said covering thereto, and means effective within the operative limits of said applying means in a direction transverse to the feeding movement and substantially parallel to the plane thereof whereby said tube is maintained in operative engagement with said applying means during the application of the covering.

2. In a machine for manufacturing hose, means for longitudinally feeding a foundation tube and an unapplied covering therefor, wrapping means for rotating said tube about its own axis during its longitudinal feed to wrap the covering thereon, and means effective at spaced intervals within the operative limits of said wrapping means in directions transverse to the feeding movement and substantially parallel to the plane thereof whereby said tube is maintained in rolling engagement with said wrapping means during the wrapping operation.

3. In a machine for manufacturing hose, a travelling carrier for longitudinally feeding a foundation tube and an unapplied covering therefor, wrapping means located in operative diagonal relation to said carrier for rotating said tube about its own axis during its longitudinal feed to wrap the covering thereon, and means effective within the operative limits of said wrapping means for maintaining said tube in rolling engagement with said wrapping means during the wrapping operation.

4. In a machine for manufacturing hose, means for longitudinally feeding a foundation tube and an unapplied covering therefor, and a continuous roller located in operative diagonal relation to said feeding means and extending over the major length thereof whereby said tube is rolled about its own axis during its longitudinal feed to wrap said covering thereon.

5. In a machine for manufacturing hose, means for longitudinally feeding a foundation tube and an unapplied covering therefor, a continuous roller located above said feeding means in operative diagonal relation thereto and extending over the major length of said feeding means, and means for rotating said roller whereby said tube is rolled about its own axis during its longitudinal feed to spirally wrap said covering thereon.

6. In a machine for manufacturing hose, means for longitudinally feeding a foundation tube and an unapplied covering therefor, a continuous roller located above said feeding means in operative diagonal relation thereto and extending over the major length of said feeding means, means for rotating said roller whereby said tube is rolled about its own axis during its longitudinal feed to spirally wrap said covering thereon, and means located along said roller for maintaining said tube in rolling engagement therewith during the wrapping operation.

7. In a machine for manufacturing hose, a travelling carrier for longitudinally feeding a foundation tube and an unapplied covering therefor, a continuous roller located above said carrier in operative diagonal relation thereto and extending over the major length of said travelling carrier, and mechanism for rotating said roller whereby said tube is rolled about its own axis during its longitudinal feed to spirally wrap said covering thereon.

8. In a machine for manufacturing hose, a travelling carrier for longitudinally feeding a foundation tube and an unapplied covering therefor, a continuous roller located above said carrier in operative diagonal relation thereto and extending over the major length of said travelling carrier, mechanism for rotating said roller whereby said tube is rolled about its own axis during its longitudinal feed to spirally wrap said covering thereon, a support extending lengthwise of said roller in parallel relation thereto, and a plurality of anti-friction devices carried by said support for maintaining said tube in rolling engagement with said roller during the wrapping operation.

9. In a machine for manufacturing hose, a travelling carrier for longitudinally feeding a foundation tube and an unapplied covering therefor, a continuous roller located above said carrier in operative diagonal relation thereto and extending over the major length of said feeding means, mechanism for rotating said roller whereby said tube is rolled about its own axis during its longitudinal feed to spirally wrap said covering thereon, a support extending lengthwise of said roller in parallel relation thereto, a plurality of rolls mounted on said support to rotate about axes transverse to the axis of said roller for maintaining said tube in rolling engagement with said roller during the wrapping operation.

10. In a machine for manufacturing hose, a frame, a travelling carrier mounted on said frame for longitudinally feeding a foundation tube and an unapplied covering therefor, a roller located above said carrier in operative diagonal relation thereto, brackets fixed upon said frame for carrying said roller and including means whereby the diagonal direction thereof relatively to said carrier may be varied, and mechanism for rotating said roller whereby said tube is rolled about its own axis during its longitudinal feed to spirally wrap said covering thereon.

11. In a machine for manufacturing hose, feeding means for longitudinally feeding a foundation tube and an unapplied covering therefor, applying means located in operative diagonal relation to said feeding means for moving said tube relatively to its feeding movement to apply said covering thereto, means for adjusting the diagonal direction of said applying means relatively to said feeding means, and independent means effective in a direction transverse to the feed and parallel to the plane of the feeding means for maintaining said tube in operative engagement with said applying means during the application of the covering.

12. In a machine for manufacturing hose, feeding means for longitudinally feeding a foundation tube and an unapplied covering therefor, applying means located in operative diagonal relation to said feeding means for moving said tube relatively to its feeding movement to apply said covering thereto, and anti-friction means effective in a direction transverse to the feed and parallel to the plane of the feeding means for maintaining said tube in operative engagement with said applying means during the application of the wrapper.

13. In a machine for manufacturing hose, a travelling carrier for longitudinally feeding a foundation tube and an unapplied covering therefor, a series of rollers diminishing in diameter in an axial direction arranged above said carrier at an angle to the path thereof adapted to cooperate with said carrier to impart a rolling movement to said tube to thereby apply said covering thereto, and means effective within the limits of said series of rollers for maintaining said tube in rolling engagement with said rollers during the application of said covering.

14. In a machine for manufacturing hose, a travelling carrier for longitudinally feeding a foundation tube and an unapplied covering therefor, a series of rollers arranged above said carrier at an angle to the path thereof adapted to cooperate with said carrier to impart a rolling movement to said tube to thereby apply the covering thereto, and independent means effective within the limits of said series of rollers for maintaining said tube in rolling engagement with said rollers during the application of said covering.

15. In a machine for manufacturing hose, a travelling carrier for longitudinally feeding a foundation tube and an unapplied covering therefor, a continuous roller located above said carrier in operative diagonal relation thereto, a second roller located in parallel relation to said continuous roller, said rollers being operatively connected with each other, and means for rotating said rollers to roll said tube about its own axis during its longitudinal feed whereby said covering is spirally wrapped upon said tube.

16. In a machine for manufacturing hose, a travelling carrier for longitudinally feeding a foundation tube and an unapplied covering therefor, a continuous roller located above said carrier in operative diagonal relation thereto, a second roller located in parallel relation to said continuous roller, said rollers being operatively connected with each other, a rib extending spirally about said second roller, and means for rotating said rollers to roll said tube about its own axis during its longitudinal feed whereby said covering is spirally wound upon said tube.

17. In a machine for manufacturing hose, means for longitudinally feeding a foundation tube and an unapplied covering therefor, applying means for rotating said tube about its own axis during its longitudinal feed to wrap the covering thereon, and a plurality of spaced rollers whereby said longitudinally moving and rotating tube is maintained in operative engagement with said applying means.

18. In a machine for manufacturing hose, means for longitudinally feeding a foundation tube and an unapplied covering therefor, applying means for rotating said tube about its own axis during its longitudinal feed to wrap the covering thereon, and a plurality of rollers having axes transverse to the feed of said tube and engaging the latter at spaced points whereby said longitudinally moving and rotating tube is maintained in operative engagement with said applying means.

CHARLES C. SPADONE.